(12) United States Patent
Li et al.

(10) Patent No.: US 6,556,660 B1
(45) Date of Patent: Apr. 29, 2003

(54) APPARATUS FOR PROVIDING REDUNDANT SERVICES PATH TO CUSTOMER PREMISES EQUIPMENT

(75) Inventors: Nga Ling Li, Staten Island, NY (US); Robert Raymond Miller, II, Convent Station, NJ (US); Jeremiah A. Okoro, Landing, NJ (US); Jesse Eugene Russell, Piscataway, NJ (US)

(73) Assignee: AT&T Corp., New York, NY (US)

( * ) Notice: Subject to any disclaimer, the term of this patent is extended or adjusted under 35 U.S.C. 154(b) by 78 days.

(21) Appl. No.: 09/841,975

(22) Filed: Apr. 25, 2001

(51) Int. Cl.[7] .................... H04M 1/24; H04M 3/08; H04M 3/22

(52) U.S. Cl. ............... 379/15.01; 379/9.05; 379/26.01; 379/29.08; 370/244; 370/248; 370/254

(58) Field of Search .................. 379/1.01, 2, 8, 379/9.05, 9.06, 15.01, 16, 17, 22, 22.04, 22.08, 27.01, 27.06, 29.08, 32.01, 32.04, 26.01; 370/217, 219, 220, 225, 227, 244, 254

(56) References Cited

U.S. PATENT DOCUMENTS

| | | | | |
|---|---|---|---|---|
| 3,865,999 A | * | 2/1975 | Spitaels | 179/175.2 |
| 4,451,708 A | * | 5/1984 | Kemler et al. | 179/98 |
| 4,653,043 A | * | 3/1987 | Brady et al. | 370/13 |
| 4,878,048 A | * | 10/1989 | Gottesman et al. | 340/825.01 |
| 4,996,702 A | * | 2/1991 | Gray | 379/1 |
| 5,187,733 A | * | 2/1993 | Beffel et al. | 379/10 |
| 5,274,692 A | * | 12/1993 | Lechner et al. | 379/6 |
| 5,369,696 A | * | 11/1994 | Krauss et al. | 379/268 |
| 5,384,823 A | * | 1/1995 | Brenski et al. | 379/10 |
| 5,509,065 A | * | 4/1996 | Fitzgerald | 379/279 |
| 5,577,096 A | * | 11/1996 | Kitano et al. | 379/2 |
| 5,734,695 A | * | 3/1998 | Seesing et al. | 379/9 |
| 5,835,566 A | * | 11/1998 | Cowgill | 379/10 |
| 5,838,766 A | * | 11/1998 | Rand | 379/9 |
| 5,933,474 A | * | 8/1999 | Kipp | 379/1 |
| 5,940,373 A | * | 8/1999 | Chiu et al. | 370/238 |
| 6,005,920 A | * | 12/1999 | Fuller et al. | 379/1 |
| 6,505,145 B1 | * | 1/2003 | Bjornson | 702/185 |

* cited by examiner

Primary Examiner—Binh Tieu
(74) Attorney, Agent, or Firm—Banner & Witcoff

(57) ABSTRACT

An apparatus that provides a redundant path for providing service using existing or original equipment when failure or degradation of performance of new equipment is detected in a communication network. A controller module monitors the performance of new equipment used to provide improved services to service provider customers. When a failure in the new equipment is detected, the controller module outputs a control signal to switch processing from the new equipment to the existing equipment that is still available for use. In addition, processing may be switched from the new equipment to the existing equipment when the controller detects degradation in the performance of the new equipment so that loss of service is prevented. Therefore, the existing equipment acts as a redundant path for processing.

11 Claims, 4 Drawing Sheets

APPARATUS FOR PROVIDING REDUNDANT SERVICES PATH TO CUSTOMER PREMISES EQUIPMENT

TECHNICAL FIELD

The present invention relates to a method and apparatus for preventing loss of service from a service provider upon failure of equipment during trial evaluations. More particularly, the present invention is directed to a method and apparatus that switches from new technology equipment being tested to existing technology equipment upon failure or degradation of performance of the new technology equipment.

BACKGROUND OF THE INVENTION

In order to meet increasing demands of customers, service providers have begun to offer a wide variety of services. For example, service providers have begun offering services including voice, data, Internet connection, etc. These services may be offered in bundled packages. The ability to offer these services depends upon the development of equipment capable of supporting the growing number of services offered to customers. The feasibility and reliability of the equipment are determined during customer trials or Beta trials, as they are sometimes called. During Beta trials, customers in the trial disconnect from the existing equipment and connect to the new equipment. If the new equipment fails during the trial, the customers lose all service until the equipment is replaced. Consequently, the customers may lose service for an extended period of time.

Therefore, there is a need for a method and apparatus for preventing the loss of service or degradation in service during new equipment trials. More particularly, there is a need for a method and apparatus for preventing loss of service or degradation in service from a service provider upon failure of equipment under test. The present invention was developed to accomplish these and other objectives.

SUMMARY OF THE INVENTION

In view of the foregoing, it is a principal object of the present invention to provide a method and apparatus that overcome the deficiencies of the prior art.

More particularly, it is an object of the present invention to provide a method and apparatus for preventing the loss of service due to failure of equipment under test by switching from the equipment under test to the existing or original equipment upon failure of the equipment under test.

Another object of the present invention is to provide a method and apparatus for monitoring the operation of the equipment under test and for switching from the equipment under test to the existing equipment upon degradation of performance of the test equipment.

Yet another object of the present invention is to provide a method and apparatus that permits the trial of new equipment with the existing equipment acting as a redundant path upon failure of the new equipment.

These and other objects and features of the present invention will be apparent upon consideration of the following detailed description of preferred embodiments thereof, presented in connection with the following drawings in which like reference numerals identify like elements throughout.

DETAILED DESCRIPTION OF THE INVENTION

The present invention was designed to address the problem of failures or degradation of performance of equipment during trial evaluations. For example, many service providers have demonstrated great interest in the emerging Asymmetric Digital Subscriber Line (ADSL) technology that allows more data to be sent over existing copper telephone lines. More particularly, the ADSL technology is capable of carrying full duplex POTS (Plain Old Telephone Service) and high-speed data to the subscriber over the existing wireline infrastructure. Using the ADSL technology, service providers may provide bundled services to their customers. Equipment capable of supporting new technology, such as the ADSL technology, is tested in Beta trials. Beta trials for the ADSL technology require customers to disconnect from the existing equipment module and connect to new equipment. If, in the course of the Beta trial, the new equipment fails, service to the customer is lost until the equipment is replaced. Therefore, upon failure of the equipment being tested, the customers suffer the inconvenience of losing service. The failure of the equipment may be the result of a hardware failure or a software failure. Much of today's equipment is software dependent. When a failure or problem occurs in the software, the equipment fails or operates poorly.

According to an aspect of the present invention, the existing equipment acts as a redundant module upon failure of the equipment being tested. In addition, the existing equipment acts as a redundant module when it is determined that the new equipment is performing poorly. Therefore, customers continue to receive service, although it may not be the desired service provided by the new equipment. Upon failure of the equipment under test, operation is automatically switched from the new technology to the existing technology so that the customer at least receives the original service. In addition, a central office may continuously monitor the status and the performance of the new equipment. If the central office detects degradation in the performance of the new equipment, the central office may output a signal to switch operation from the new equipment to the existing equipment in order to prevent complete loss of service. In some instances, the central office may be interested in determining how long the new equipment may operate until a failure occurs. In this case, when the central office detects that the new equipment is performing poorly, the central office may allow the new equipment to operate until a failure occurs.

Figure 1:
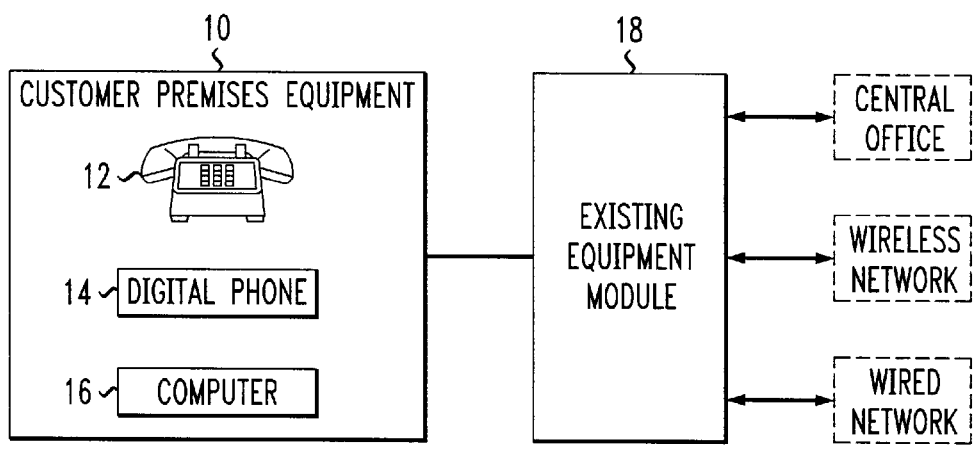
FIG. 1 is a block diagram of a typical system.

Referring to FIG. 1, services are usually provided to the customer via the existing equipment module 18 connected between the customer premises equipment 10 and the wireless/wired network and the central office. The customer premises equipment 10 may include a telephone 12, a digital phone 14, a computer 16, and other devices. During trial evaluations of new equipment, the existing equipment module 18 is replaced with the new equipment. If the new equipment fails during the trial, service is lost until the faulty equipment is replaced.

According to the present invention, the existing equipment module 18 acts as a redundant module to provide service even when the new equipment under test fails. The new equipment may support technology such as point-to-point protocol, point-to-multiple-point protocol, DSL technology, etc. The existing equipment may support existing technology such as an analog service, for example.

Figure 2:
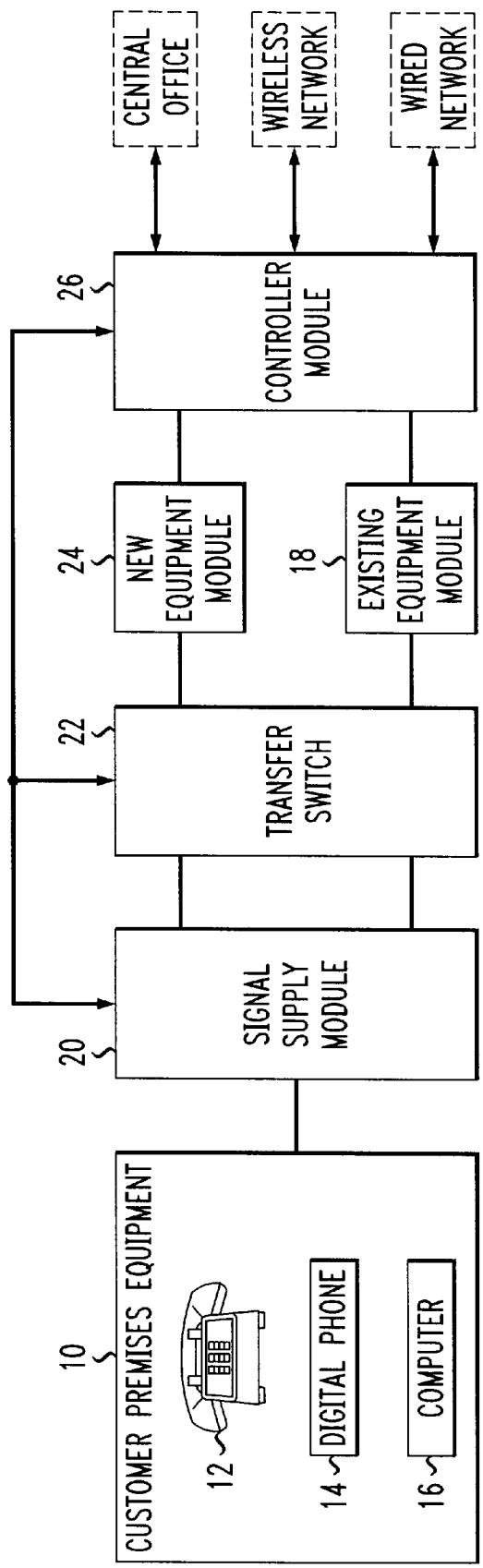
FIG. 2 is a block diagram of a system according to an aspect of the present invention.

Referring to FIG. 2, the present invention includes a Customer Premises Technology Interface Module that includes a signal supply module 20, a switch 22, and a controller module 26. The signal supply module 20 is connected to both new equipment module 24 and the existing equipment module 18 via switch 22. The new equipment module 24 and the existing equipment module 18 are connected to the controller module 26. The output from the controller module 26 may be connected to a central office, a wireless network and/or a wired network. The signal supply module 20 receives input from the customer premises equipment 10 and supplies output to the switch 22. The output from the signal supply module 20 is supplied to the new equipment module 24 via switch 22 unless failure or performance degradation is detected in the new equipment module 24. The controller module 26 detects failure or performance degradation of the new equipment module 24 and sends a signal to both the signal supply module 20 and to the switch 22 to switch connection of the signal supply unit 20 from the new equipment module 24 to the existing equipment module 18. Therefore, upon receipt of the signal from the controller module 26, service is switched to the original service (not the desired new service) provided by the existing equipment module 18. In this manner, the loss of service may be prevented upon failure of the new equipment module 24.

Figure 3:
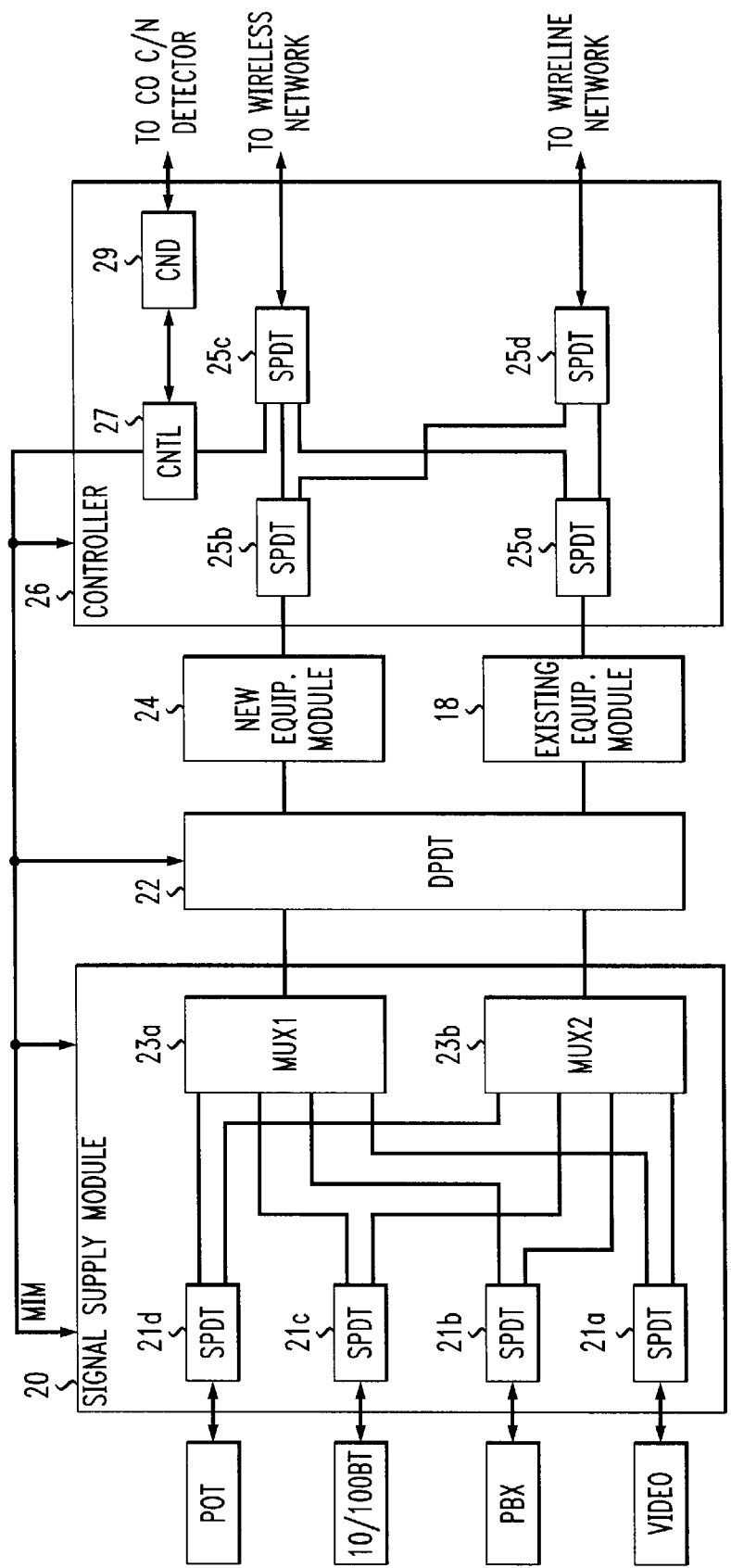
FIG. 3 is a detailed block of the system shown in FIG. 2.

As shown in FIG. 3, the signal supply module 20 includes single pole double throw (SPDT) switches 21a–21d, and multiplexers 23a and 23b. The signal supply module 20 may receive input for POTS, 10/100BaseT, PBX and video, for example. An input signal received by any one of the SPDT switches 21a–21d is routed either to multiplexer 23a for a technology under test-path (TUTP) or to multiplexer 23b for the existing technology path (ETP). The switch 22, which may be implemented as a double pole double throw (DPDT) switch, accepts the signal from the signal supply module 20 and supplies it to the new equipment 24 via the TUTP or to the existing equipment module 18 via the ETP. The output from either the new equipment module 24 or the existing equipment module 18 is supplied to the controller module 26, which determines whether the service is wireline or wireless. The controller module 26 includes SPDT switches 25a–25d that route the signal either to the wireline network or to the wireless network. For example, the ADSL technology uses the current wireline infrastructure, while point-to-point and point-to-multipoint wireless radio systems use the wireless network structure. The controller module 26 also includes a controller (CNTL) 27 that routes the signal from the new equipment module 24 to the existing equipment module 18 when the controller 27 detects a fault or degradation in performance in the new equipment module 24. A carrier-to-noise detector (CND) 29 is also provided in the controller module 26. The CND 29 monitors the carrier-to-noise (CND) ratio or bit error rate (BER) of the signal from the new equipment module 24. The central office (CO) is able to monitor the performance of the new equipment module 24 via the output of the CND 29. When degradation in the signal from the new equipment module 24 is detected by the CND 29 and the CO, the CO may output a control signal to switch operation from the new equipment module 24 to the existing equipment module 18.

The automatic routing to the redundant path (ETP) of the existing equipment module 18 ensures uninterrupted service. The service provider does not have to scramble around for solutions since the existing equipment module 18 takes over. This affords the service provider some time for a permanent solution. Once the trial is complete and the faults isolated and solved, the CPTIM, including the signal supply module 20, switch 22, and the controller module 26, may be disconnected along with the existing equipment module 18, and the new equipment module 24 may be permanently commissioned for service.

Figure 4:
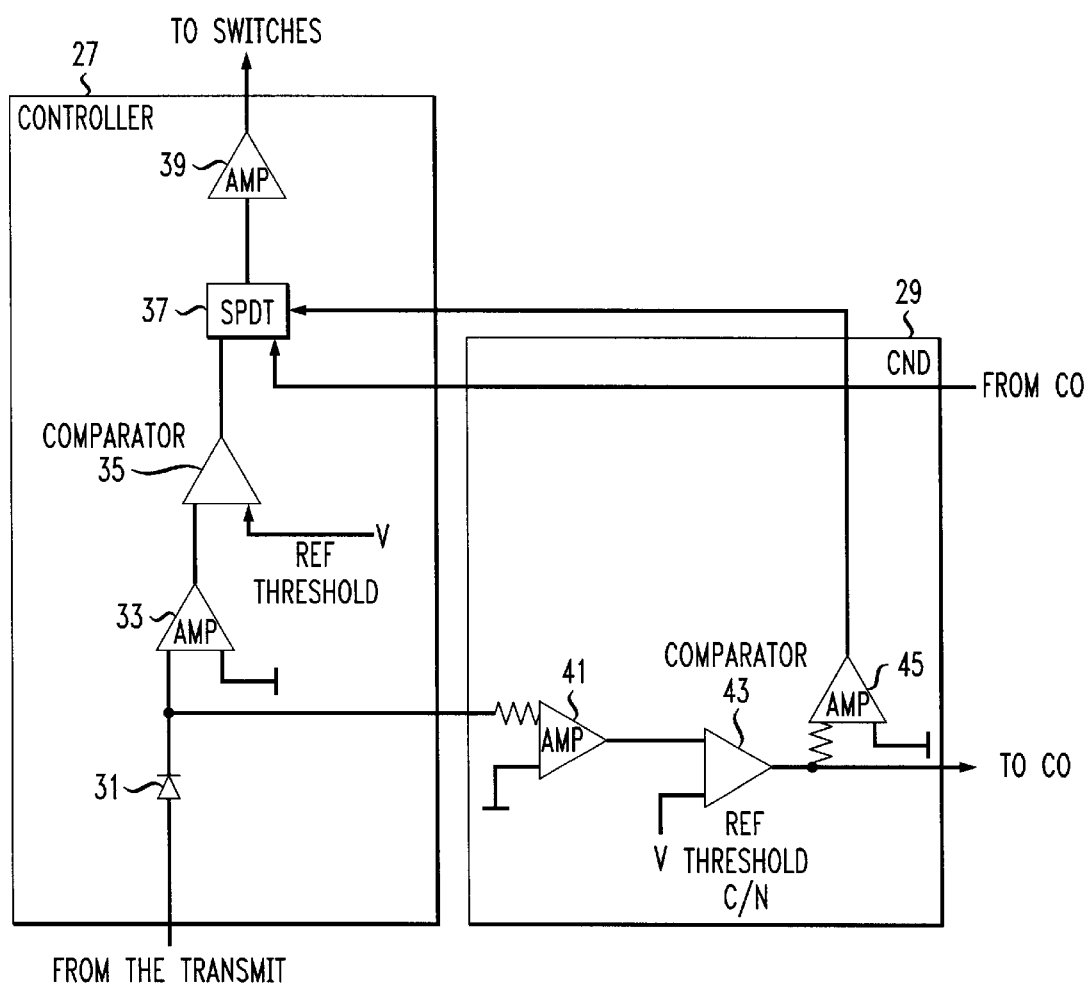
FIG. 4 illustrates the controller and the carrier-to-noise ratio detector shown in FIG. 3.

The controller 27 and the carrier-to-noise detector 29 are described in more detail with respect to FIG. 4. The controller 27 includes a diode detector 31, a DC amplifier 33, a comparator 35, a SPDT switch 37 and an amplifier 39. The diode detector 31 detects the output signal from the new equipment module 24. The comparator 35 compares the detected signal with a reference threshold voltage $V_{ref1}$. The reference threshold voltage $V_{ref1}$ may be set to any appropriate level according to the equipment being tested. If the detected signal is below the reference threshold voltage $V_{ref1}$, the controller 27 outputs a signal to the signal supply module 20 and to the switch 22 that results in service being switched from the new equipment module 24 to the existing equipment module 18.

In addition, the SPDT switch 37 in the controller 27 makes it possible for the CO to control the connection of the service provided to the customer based upon the quality of the signal from the new equipment module 24. More particularly, the CO may switch service from the new equipment module 24 to the existing equipment module 18 when degradation in the detected signal from the new equipment module 24 is detected. The degradation in the signal may be detected via the C/N ratio or the BER, for example.

In FIG. 4, the signal from the new equipment module 24 is supplied from the diode 31 to an amplifier 41 in the CND 29. The output from the amplifier 41 is supplied to a comparator 43, which compares the detected signal with a reference threshold voltage $V_{ref2}$. The reference threshold voltage $V_{ref2}$ may be set to any appropriate value depending upon the new equipment module 24. The output from the comparator 43 is supplied to the SPDT switch 37 via amplifier 45 and to the CO. When the detected signal from the diode 31 is below the reference threshold voltage $V_{ref2}$, the output from the comparator 43 causes the position of the SPDT switch 37 to change position from the default position shown in FIG. 4 to the position for receiving a signal from the CO to switch service from the new equipment module 24 to the existing equipment module 18 to prevent loss of service. Therefore, the signal from the amplifier 45 acts as a control signal for the SPDT switch 37. Therefore, the output from the comparator 43 enables the CO to monitor the performance of the new equipment module 24. This way, as the BER or the C/N ratio degrades, the central office can decide whether to take action before there is total loss of service.

The operation of the present invention will now be described. The CPTIM is a customer interface module having possible inputs POTS, 10/100BaseT, PBX, and video, to the signal supply module 20, as shown in FIG. 3. These inputs are routed to multiplexer 23a for the new equipment module 24 where they are multiplexed. The output from the multiplexer 23a is forwarded to the new equipment module 24 via the DPDT switch (or transfer switch) 22. The output of the new equipment module 24 is supplied to the controller module 26, where a determination is made if service is a wireline service or a wireless service. The SPDT switches 25a-25d in the controller module 26 route the signal to the appropriate network. Should a fault or loss of signal occur in the new equipment module 24, it is detected by the controller 27, which automatically sends control signals to the switches 21*a*–21*d* in the signal supply module 20 and to the switch 22 to route the signal from the customer premises equipment 10 to the existing equipment module 18. The routing operation takes place without customer involvement. The customer continues to receive the original service until the service provider corrects the problem.

The CND 29 in the controller module 26 also receives the signal output from the new equipment module 24 and provides continuous monitoring of the performance of the new equipment module 24. When the signal from the new equipment falls below the reference threshold voltage $V_{ref2}$, a signal is sent to the SPDT switch 37 via the amplifier to change the position of the switch 37 from the position shown in FIG. 4 to a position for receiving a signal from the CO. Since the output from the comparator 43 is also supplied to the CO, the CO is aware of problems in the performance of the new equipment module 24. The CO may elect to output a signal to switch 37 to switch operation from the new equipment module 24 to the existing equipment module 18. In response to such a signal from the CO, the controller 27 outputs a signal to the signal supply module 20 and to the switch 22 to effect the change of operation. Once the problem is resolved, operation may be returned to the new equipment module 24 or its replacement equipment. Alternatively, the CO may elect to allow the new equipment module 24 to fail to determine the conditions under which failure occurs.

Alarms indicating poor performance of the new equipment module 24 in the controller module 26 may be reported through the network management system. In another embodiment, when the CND 29 determines that the new equipment is performing poorly, a signal may be sent to a pager of a technician, for example, so that the technician may respond appropriately. At the end of the trial period, and after all of the problems are resolved, the CPTIM and the existing equipment module 18 may be disconnected.

While particular embodiments of the invention have been shown and described, it is recognized that various modifications thereof will occur to those skilled in the art without departing from the spirit and scope of the invention.

What is claimed is:

1. An apparatus for providing an operating path via one of an existing equipment module and a new equipment module in a network, the apparatus comprising:

signal supply module receiving signals from customer premises equipment;

a transfer switch connected between the output of the signal supply module and respective inputs of the new equipment module and the existing equipment module; and a controller module, connected to respective outputs of the new equipment module and the existing equipment module, to the signal supply module and to the transfer switch, for controlling the operation of the signal supply module and the transfer switch to process signals via one of the new equipment module and the existing equipment module.

2. The apparatus according to claim 1, wherein the controller module is arranged to detect failure in the new equipment module and to output a control signal to the signal supply module and to the transfer switch to change processing from the new equipment module to the existing equipment module when failure in the new equipment module is detected.

3. The apparatus according to claim 1, wherein the controller module is arranged to monitor a signal output from the new equipment module representing the performance of the new equipment module and to switch processing from the new equipment module to the existing equipment module based upon the performance of the new equipment module.

4. The apparatus according to claim 3, wherein the controller module is arranged to detect a carrier-to-noise ratio of the signal output from the new equipment module, and switches processing from the new equipment module to the existing equipment module when the carrier-to-noise ratio of the signal is below a first predetermined threshold value.

5. An apparatus for providing an operating path via one of an existing equipment module and a new equipment module in a network, the apparatus comprising:

a signal supply module receiving signals from customer premises equipment;

a transfer switch connected between the output of the signal supply module and respective inputs of the new equipment module and the existing equipment module; and a controller module, connected to respective outputs of the new equipment module and the existing equipment module, to the signal supply module and to the transfer switch, for controlling the operation of the signal supply module and the transfer switch to process signals via one of the new equipment module and the existing equipment module, wherein the controller module comprises:

a diode for receiving the signal output from the new equipment module;

a first comparator that compares a signal output from the diode with a first predetermined threshold value;

a switch for receiving one of an output signal from the first comparator and a control signal from a central office;

wherein the controller module controls the operation of the signal supply module and the transfer switch via an output from the switch to process signals via one of the new equipment module and the existing equipment module based upon one of the output signal from the comparator and the control signal from the central office.

6. The apparatus according to claim 5, wherein the controller module determines that a failure has occurred in the new equipment module when the signal from the diode is below the first predetermined threshold value, and controls the switch to output a signal to the signal supply module and to the transfer switch to change processing from the new equipment module to the existing equipment module.

7. The apparatus according to claim 5, wherein the controller module further comprises:

a second comparator that compares the signal from the diode with a second predetermined threshold value and outputs an output signal to the central office and to the switch, wherein the output signal from the second comparator controls the switch to receive one of the output from the first comparator and the control signal from the central office.

8. The apparatus according to claim 7, wherein the controller module determines that the performance of the new equipment module has degraded when the signal from the diode is below the second predetermined threshold value, and controls the switch to receive the control signal from the central office and to output the signal to the signal supply module and to the transfer switch to change processing from the new equipment module to the existing equipment module.

9. An apparatus for providing an operating path via one of an existing equipment module and a new equipment module in a network, the apparatus comprising:

first means for receiving signals from customer premises equipment;

second means, connected between the output of the first means and respective inputs of the new equipment module and the existing equipment module; and third means, connected to respective outputs of the new equipment module and the existing equipment module, to the first means, and to the second means, for controlling the operation of the first means and the second means to process signals via one of the new equipment module and the existing equipment module.

10. An apparatus for providing an operating path via one of an existing equipment module and a new equipment module in a network, the apparatus comprising:

first means for receiving signals from customer premises equipment;

second means, connected between the output of the first means and respective inputs of the new equipment module and the existing equipment module; and third means, connected to respective outputs of the new equipment module and the existing equipment module, to the first means, and to the second means, for controlling the operation of the first means and the second means to process signals via one of the new equipment module and the existing equipment module, wherein the third means comprises:

first receiving means for receiving the signal output from the new equipment module;

first comparing means for comparing a signal output from the first receiving means with a first predetermined threshold value;

second receiving means for receiving one of an output signal from the first comparing means and a control signal from a central office;

wherein the third means is arranged to control the operation of the first means and the second means via an output from the second receiving means to process signals via one of the new equipment module and the existing equipment module based upon one of the output signal from the first comparing means and the control signal from the central office.

11. The apparatus according to claim 10, wherein the third means further comprises:

second comparing means for comparing the signal from the first receiving means with a second predetermined threshold value and for outputting an output signal to the central office and to the second receiving means, wherein the output signal from the second comparing means controls the first receiving means to receive one of the output from the first comparing means and the control signal from the central office.

* * * * *